Patented Mar. 15, 1938

2,111,260

UNITED STATES PATENT OFFICE 2,111,260

WATER-SOLUBLE ADDITION COMPOUNDS, CONTAINING SULPHUR, OF ALKYL OR ARALKYL HALIDES AND PROCESSES OF PREPARING THEM

Arnold Brunner, Frankfort-on-the-Main-Hochst, Germany, assignor to General Aniline Works, Inc., New York, N. Y., a corporation of Delaware No Drawing. Application September 19, 1936, Serial No. 101,676. In Germany September 25, 1935

12 Claims. (Cl. 260—143)

This invention relates to water-soluble addition compounds, containing sulphur, of alkyl or aralkyl halides and to a process of preparing them.

I have found that alkyl or aralkyl halides, especially compounds of the formula Xhal wherein X stands for a member of the group consisting of alkyl, aralkyl and substituted aralkyl radicals and hal stands for a halogen atom may be transformed into water-soluble compounds containing sulphur by causing them to react with aliphatic thio-ethers which contain free hydroxyl groups i. e. substances of the type HORSROH wherein R stands for a member of the group consisting of aliphatic hydrocarbon radicals, aliphatic hydrocarbon radicals substituted by hydroxyl and aliphatic hydrocarbon radicals whose chain is interrupted by O. The reaction is effected by intimately mixing the two reaction components, for instance, by stirring. The probable constitution of the compounds thus produced is the following:

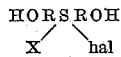

wherein R, hal and X have the above definitions.

The new compounds are useful as dyeing adjuvants. In the pure state they are liquid or crystalline colorless products which are soluble in water.

The following examples serve to illustrate the invention but they are not intended to limit it thereto; the parts are by weight:

(1) 94 parts of thiodiglycol are stirred with 63.2 parts of benzyl chloride. After about 24 hours, a homogeneous, highly viscous liquid has formed from the two layers, which is soluble in cold water, except for a slight turbidity which disappears on heating. After standing for a prolonged time, large colorless crystals separate: when isolated and washed with ether, these appear to have the following constitution:

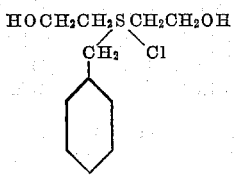

They are very easily soluble in water and in alcohol, but insoluble in ether and in acetone. After dissolution in alcohol and subsequent precipitation by acetone they melt at 81° C.

(2) 36 parts of thiodiglycol are stirred with 40 parts of 3-nitro-4-methoxybenzyl chloride (melting at 87° C.): obtainable as described in U. S. A. specification No. 1,887,396 Example 5. After about 75 hours' stirring, the mass has become soluble in water and has solidified in the form of crystals. The substance may be purified by recrystallization from alcohol and has then a melting point of 115° C. The product is very easily soluble in water and in hot alcohol, but insoluble in ether and in acetone.

(3) 124 parts of 3-chloro-4-methoxybenzyl chloride (melting at 38° C.: obtainable by the process of U. S. Patent No. 1,887,396 from chloranisole, formaldehyde and hydrochloric acid) are melted and stirred with 124 parts of thiodiglycol. After about 6 hours the mixture solidifies to a water-soluble crystalline mass which, after recrystallization from hot alcohol, melts at 113° C. The solubility properties of the product are the same as that of the product obtainable according to Example 2.

(4) 384 parts of thiodiglycol are stirred with 333 parts of the methoxybenzyl chloride obtainable as described in "Bulletin de la Société Chimique de France" (5) 1, (1934) pages 1030–1031 and constituting a mixture of ortho- and para-methoxybenzyl chlorides (as is shown in "Helvetica Chimica Acta" 1935, Vol. XVIII, pages 954 et seq.). After about 24 hours a homogeneous, highly viscous mass has formed which dissolves in water to a slightly turbid solution. The product dissolves in alcohol and in acetone but is insoluble in petroleum ether and in ether.

(5) 68.4 parts of thiodiglycol are stirred with 57 parts of 2.5-dimethylbenzyl chloride. After about 40 hours, the mass has become homogeneous and soluble in water. It dissolves in alcohol and in ether, but is insoluble in acetone and in petroleum ether.

(6) 200 parts of thiodiglycol are stirred with 100 parts of the mixture of isomeric di-(chloromethyl)-xylenes which is obtainable in the form of crystals from a commercial mixture of xylenes by action of formaldehyde and hydrochloric acid. After about 10 days, the crystals have dissolved. The highly viscous liquid thus produced dissolves in water to a slightly turbid solution. It is also soluble in alcohol, but insoluble in acetone and in ether.

(7) 180 parts of thiodiglycol are stirred with 176.5 parts of alpha-chloromethylnaphthalene. After about 24 hours, the mass solidifies to crystals. The product may be purified by dissolution in alcohol and subsequent precipitation with

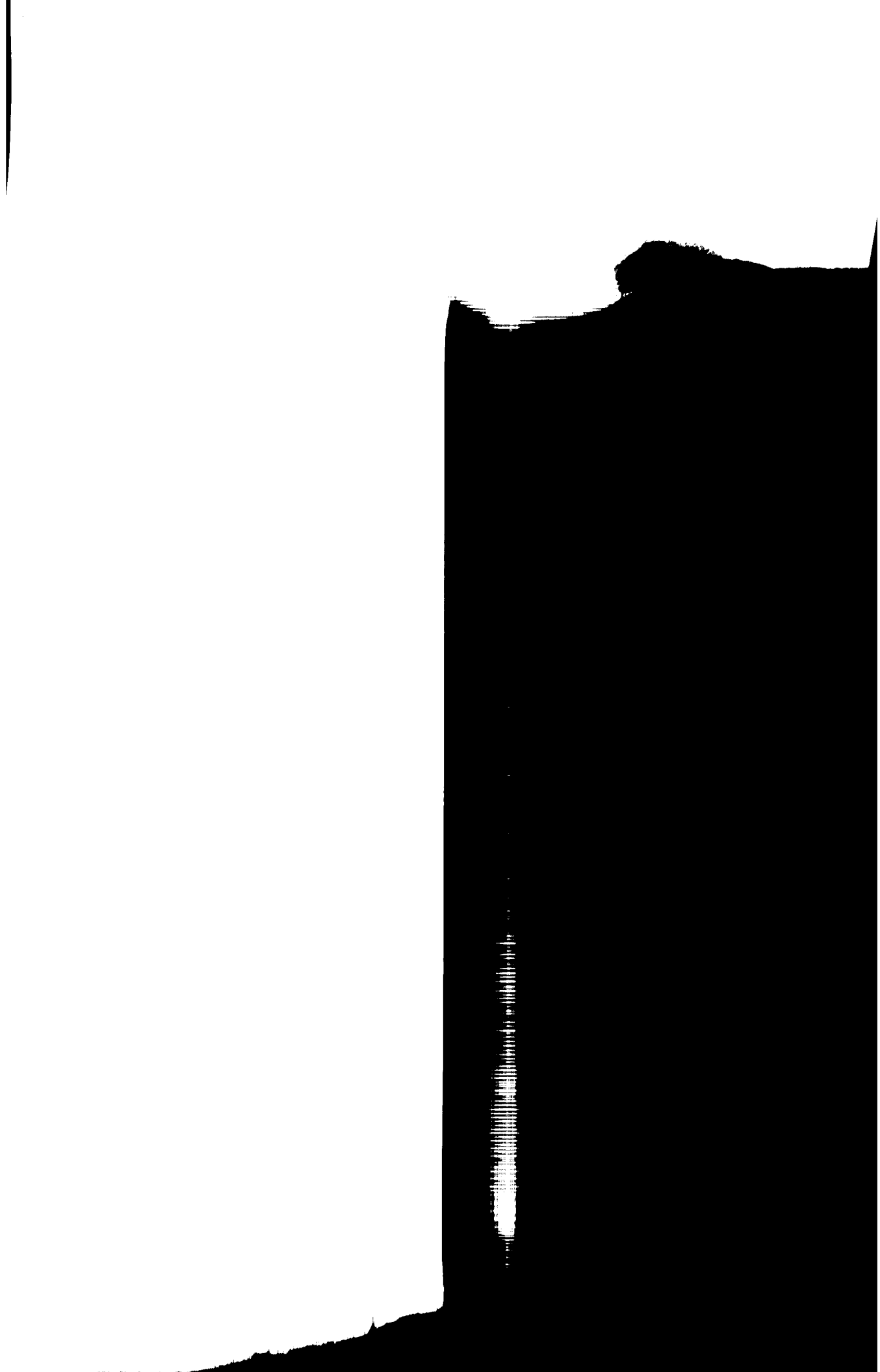

9. The products of the formula:

HOCH₂CH₂S CH₂CH₂OH
\ /
CH₂   Cl
|
X wherein X stands for a member of the group consisting of aryl radicals and aryl radicals substituted by a member of the group consisting of OH, O.alkyl, alkyl, halogen and NO₂ the products being colorless bodies soluble in water.

10. The product of the formula:

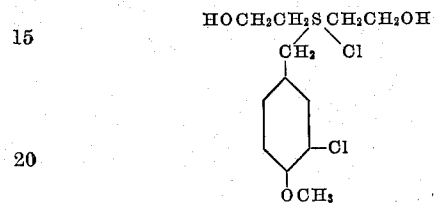

forming colorless crystals melting at 113° C. and being soluble in water and hot ethyl alcohol, insoluble in ether and acetone.

11. The product of the formula:

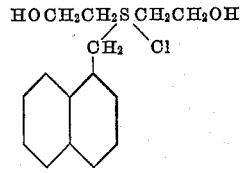

forming colorless crystals melting at 112° C. and being soluble in water and hot ethyl alcohol, insoluble in ether and acetone.

12. The product of the formula:

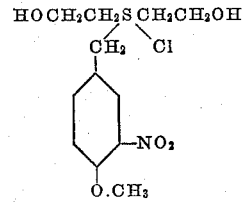

forming colorless crystals melting at 115° C. and being soluble in water and hot ethyl alcohol, insoluble in ether and acetone.

ARNOLD BRUNNER.